US008706388B2

(12) United States Patent
Pschierer et al.

(10) Patent No.: US 8,706,388 B2
(45) Date of Patent: Apr. 22, 2014

(54) IDENTIFYING RESTRICTED MOVEMENT AREAS ON ELECTRONIC AIRPORT CHARTS

(75) Inventors: Karl Christian Pschierer, Ochsenfurt (DE); André Marco Lutz, Neu-Isenburg (DE)

(73) Assignee: The Boeing Company, Chicago, IL (US)

( * ) Notice: Subject to any disclaimer, the term of this patent is extended or adjusted under 35 U.S.C. 154(b) by 1020 days.

(21) Appl. No.: 12/328,960

(22) Filed: Dec. 5, 2008

(65) Prior Publication Data

US 2010/0332112 A1 Dec. 30, 2010

(51) Int. Cl.

*G06F 19/00* (2011.01)
*G06G 7/70* (2006.01)
*G06G 7/76* (2006.01)

(52) U.S. Cl.

USPC ........... 701/120; 701/301; 701/302; 340/961; 340/972; 342/29

(58) Field of Classification Search

USPC ............... 701/3, 14, 120, 121, 122, 435–438, 701/301, 302; 340/945, 951, 961, 972; 342/29–32, 36–40, 454

See application file for complete search history.

(56) References Cited

U.S. PATENT DOCUMENTS

| | | | | |
|---|---|---|---|---|
| 6,199,008 | B1 * | 3/2001 | Aratow et al. | 701/120 |
| 2002/0138200 | A1 * | 9/2002 | Gutierrez | 701/301 |
| 2003/0200024 | A1 * | 10/2003 | Poreda | 701/120 |
| 2007/0021908 | A1 * | 1/2007 | Jaugilas et al. | 701/208 |
| 2008/0109160 | A1 * | 5/2008 | Sacle et al. | 701/208 |
| 2008/0195309 | A1 * | 8/2008 | Prinzel, III et al. | 701/208 |
| 2009/0018713 | A1 * | 1/2009 | Coulmeau et al. | 701/3 |
| 2010/0231721 | A1 * | 9/2010 | Meloche et al. | 348/159 |

OTHER PUBLICATIONS

Vernaleken, "Considerations on symbology, data requirements and operational concept for integral NOTAM visualization on airport moving map displays", SPIE Defense and Security Symposium, Orlando, Mar. 20, 2008, one page.

NAVTEQ on board, 2008, 1 page http://gpsmagazine.com/2008/08/garmin_announces_7_new_nuvi_gp.php and http://www.geiz-shop24.de/buy/C103-149.php.

* cited by examiner

*Primary Examiner* — Jeffrey Shapiro

(74) *Attorney, Agent, or Firm* — Yee & Associates, P.C.

(57) ABSTRACT

A method, apparatus, and computer program product for graphically identifying operational restrictions for an airport area. The aircraft type is identified to form an identified aircraft type. A number of restrictions are identified for the airport area using the identified aircraft type to form a number of associated restrictions. The number of associated restrictions is presented as a number of graphical indicators on a display of the airport area in locations for the number of associated restrictions.

20 Claims, 14 Drawing Sheets

IDENTIFYING RESTRICTED MOVEMENT AREAS ON ELECTRONIC AIRPORT CHARTS

BACKGROUND INFORMATION

1. Field

The present disclosure relates generally to an improved data processing system and, in particular, to a method and apparatus for identifying areas of restricted movement at an airport.

2. Background

Many types of aircraft may operate in an airport. The different types of aircraft have different sizes, weights, and shapes. Airport environments may have restrictions for the movement of certain types of aircraft. For example, very large and/or heavy aircraft such as, for example, an Airbus A380 or a Boeing 747, may have their movement restricted because of their wingspan, turn radius, and/or other characteristics. Restrictions on movement also may be present based on the direction in which engine startups may be allowed in an airport. Further, an airport runway, a taxiway, or some other area may have debris present and/or repairs being performed requiring temporary restrictions.

This type of information is currently presented to a pilot in a text form in Notices to Airmen (NOTAMs) or on charts of an airport. In some cases, a pointer may be used to highlight the location of a restriction. The pilot then refers to the textual description of the restriction for the particular location. These charts may be in paper and/or electronic form. In all cases, a pilot has to memorize the data and use the data appropriately when operating in these areas.

For example, a restriction may be "taxiway U between A3 and A4 restricted to 118 foot (36 meter) maximum wingspan". Another example may be "taxiway C between F and TYW B5 speed restriction maximum 20 knots applies to all aircraft above 171 foot wingspan". Yet another example may be "powered arrival by aircraft larger than B767 to gate A1 not permitted due to jet blast". This type of information is an example of information that may be presented to a pilot on a chart of an airport.

With this type of system, the pilot is required to divert time and attention to the text and remember the restrictions for particular areas. The pilot may identify the relevant text based on a pointer. This type of process slows down the speed of retrieving information. As a result, the time needed to perform other duties for landing and/or takeoff may be increased. Further, the pilot has to remember all of the relevant restrictions and move the aircraft based on the restrictions while taxiing.

As a result, the workload of pilots is increased in addition to the amount of time needed to perform certain operations at an airport possibly being increased.

Therefore, it would be advantageous to have a method and apparatus that overcomes at least some of the issues described above.

SUMMARY

In one advantageous embodiment, a method is presented for graphically identifying operational restrictions for an airport area. An aircraft type is identified to form an identified aircraft type. A number of restrictions are identified for the airport area using the identified aircraft type to form a number of associated restrictions. The number of associated restrictions is presented as a number of graphical indicators on a display of the airport area in locations for the number of associated restrictions.

In another advantageous embodiment, an apparatus comprises a display and a processor. The processor is configured for identifying an aircraft type to form an identified aircraft type. The processor is also configured for identifying a number of restrictions for the airport area using the identified aircraft type to form a number of associated restrictions. Further, the processor is configured for presenting the number of associated restrictions as a number of graphical indicators on the display for the airport area in locations for the number of associated restrictions.

In yet another advantageous embodiment, a computer program product for graphically identifying operational restrictions for an airport area comprises a computer recordable storage medium and program code, stored on the computer recordable storage medium. Program code is present for identifying an aircraft type to form an identified aircraft type. Program code is also present for identifying a number of restrictions for the airport area using the identified aircraft type to form a number of associated restrictions. Further, program code is present for presenting the number of associated restrictions as a number of graphical indicators on a display of the airport area in locations for the number of associated restrictions.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
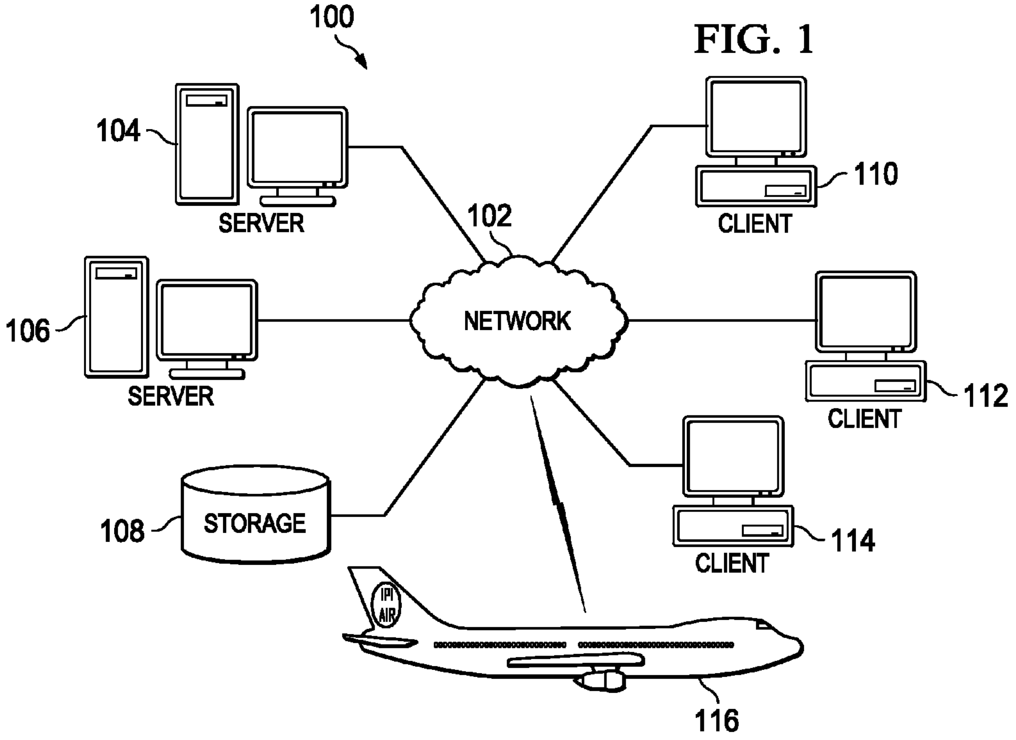
FIG. 1 is a pictorial representation of a network of data processing systems in which the advantageous embodiments may be implemented.
Figure 2:
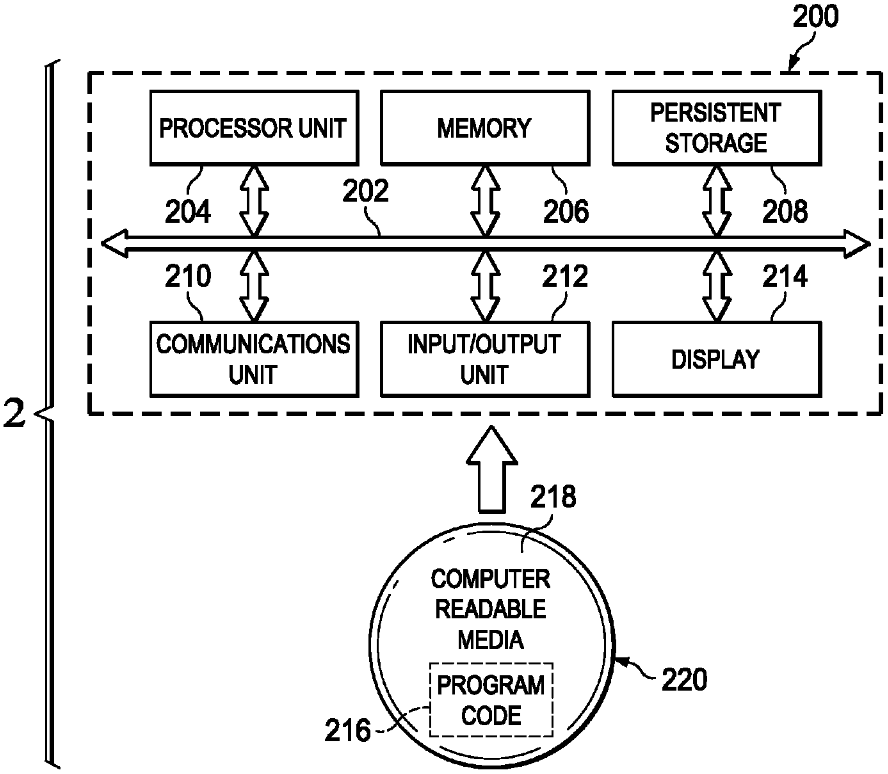
FIG. 2 is a diagram of a data processing system in accordance with an advantageous embodiment.

With reference now to the figures and, in particular, with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106.

Aircraft 116 may exchange data with different computers through a wireless communications link while in-flight or any other type of communications link while on the ground. In these examples, server 104, server 106, client 110, client 112, and client 114 may be computers at various locations. For example, client 110 may be located at an airport. In particular, client 110 may be located in a control tower or an airline office at the airport. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks such as, for example, an intranet, a local area network (LAN), or a wide area network (WAN). FIG. 1 is intended as an example and not as an architectural limitation for different embodiments.

Turning now to FIG. 2, a diagram of a data processing system is depicted in accordance with an illustrative embodiment. Data processing system 200 is an example of a data processing system that may be used to implement servers and clients, such as server 104 and client 110. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or nonvolatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is in a functional form on computer readable media 218 and may be loaded onto or transferred to data processing system 200 for execution by processor unit 204. Program code 216 and computer readable media 218 form computer program product 220 in these examples.

In one example, computer readable media 218 may be in a tangible form such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown.

The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form. In yet another example, a bus system may be used to implement communications fabric 202 and may be comprised of one or more buses, such as a system bus or an input/output bus.

Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize and take into account that the pilot has to read the complete chart to identify which notes affect the pilot. The different advantageous embodiments also recognize and take into account that the information on charts of airports are not tailored or presented for the type of aircraft being operated by a pilot. As a result, the different advantageous embodiments recognize and take into account that a pilot has to sort through all of the different restrictions on an airport chart to identify restrictions that are relevant for the particular aircraft being operated by the pilot.

The different advantageous embodiments recognize and take into account that these and other issues with current charts containing restrictions may increase the workload and/or time of a pilot needed to perform operations at an airport.

Thus, the different advantageous embodiments provide a capability to graphically depict restrictions in different areas of an airport using electronic and/or printed charts. The different advantageous embodiments provide a capability to use graphical indicators to highlight and identify different areas. Further, the different advantageous embodiments provide a capability to more easily identify restrictions for the aircraft being operated by the pilot using the chart of the airport.

The different advantageous embodiments provide a method, apparatus, and computer usable program code for identifying operational restrictions for an airport area. An aircraft type is identified to form an identified aircraft type. A number of restrictions for the airport area are identified using the identified aircraft type to form a number of associated restrictions. A number, as used herein, when referring to items refers to one or more items. For example, a number of restrictions is one or more restrictions. The number of associated restrictions is presented as a number of graphical indicators on a display of the airport area in locations for the number of associated restrictions.

In this manner, the different advantageous embodiments may inform a pilot and/or other users about operational restrictions for an airport area for a particular type of aircraft using electronic and/or paper charts.

Figure 3:
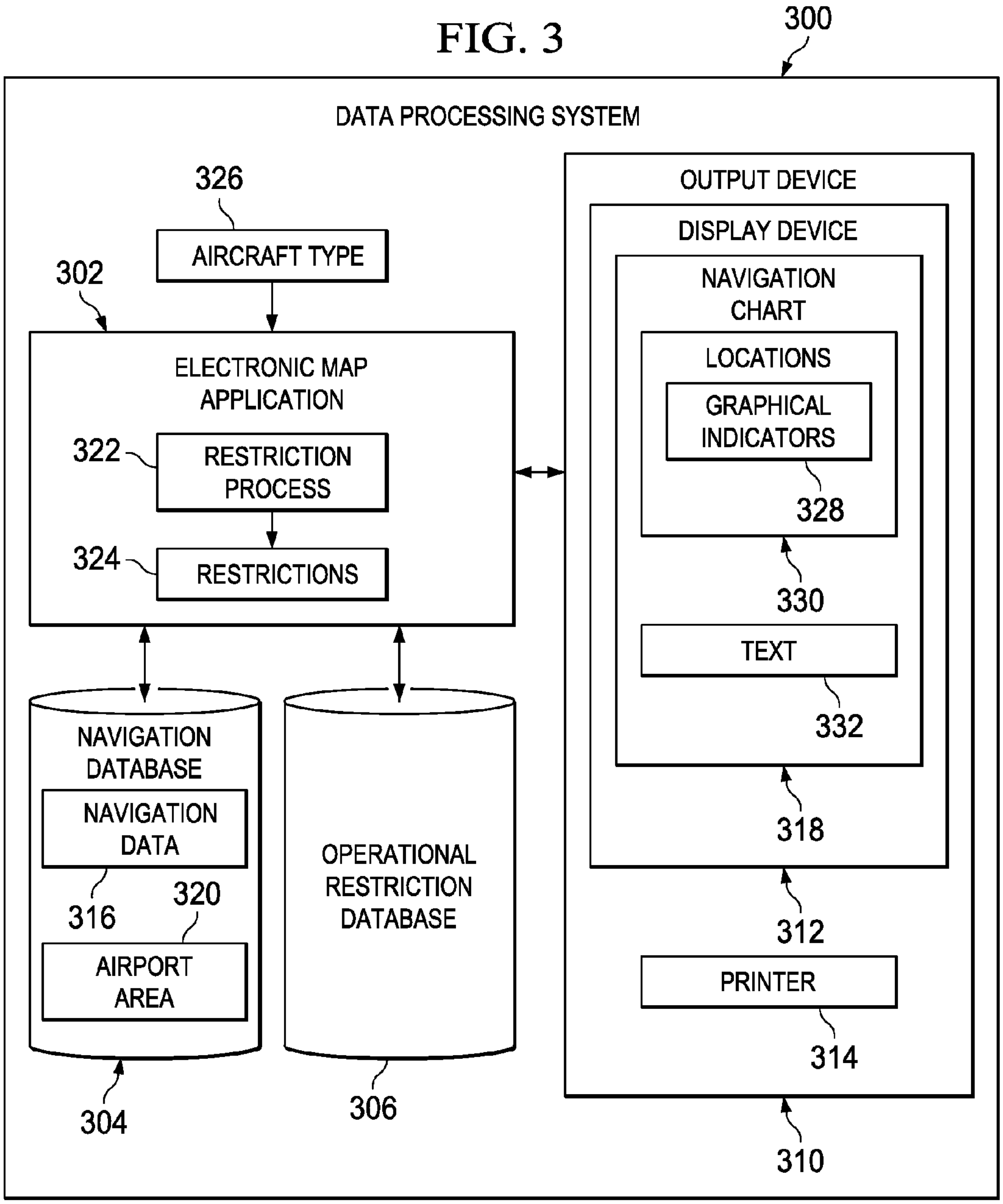
FIG. 3 is a block diagram of an apparatus for identifying operational restrictions for an airport area in accordance with an advantageous embodiment.

With reference now to FIG. 3, a block diagram of an apparatus for identifying operational restrictions for an airport area is depicted in accordance with an advantageous embodiment.

In this example, data processing system 300 may be implemented using data processing system 200 in FIG. 2. Data processing system 300 may be implemented in various forms. For example, data processing system 300 may be located in an aircraft such as, for example, aircraft 116 in FIG. 1. Data processing system 300 may be a single data processing system or a network of data processing systems containing multiple computers and/or line replaceable units.

In these advantageous embodiments, data processing system 300 may be, in another example, an electronic flight bag. An electronic flight bag is an electronic information management device used by flight crews to perform management tasks. An electronic flight bag may, for example, provide navigation charts for air and ground operations. An electronic flight bag also may provide a display of various aviation data as well as perform basic calculations.

In other advantageous embodiments, data processing system 300 may be located in an airport. For example, data processing system 300 may be located in a control tower, an airline, or some other suitable location. Data processing system 300 also may be located in a location remote to the airport such as, for example, a chart provider.

In this example, data processing system 300 includes electronic map application 302, navigation database 304, operational restriction database 306, and output device 310. Output device 310 may be display device 312 and/or printer 314. Display device 312 provides a user interface for an operator to see information in charts presented by electronic map application 302. Electronic map application 302 presents navigation data 316 from navigation database 304 in the form of navigation chart 318.

Navigation data 316 may include information about a geographic area, such as airport area 320. Airport area 320 may be a portion of an airport or an entire airport.

Electronic map application 302 may present navigation chart 318 in a number of different ways. In some advantageous embodiments, electronic map application 302 may provide a moving map function. When navigation chart 318 is presented using a moving map function by electronic map application 302, electronic map application 302 may display the location of the aircraft as an icon on navigation chart 318 in display device 312. Additionally, the icon may move and/or change orientation as the aircraft moves to show the position of the aircraft on navigation chart 318. In other advantageous embodiments, navigation chart 318 may be an electronic chart without a moving map function.

In the different advantageous embodiments, restriction process 322 in electronic map application 302 uses operational restriction database 306 to identify restrictions 324 for aircraft type 326. In this manner, the different advantageous embodiments provide a capability to present restrictions 324 for aircraft type 326 without restrictions for other aircraft types. Aircraft type 326 is the type of an aircraft of interest in these examples.

Some examples of aircraft type 326 include, without limitation, a Cessna 172, a Boeing 737, a Boeing B747-400, an Airbus A380, or some other suitable aircraft type. These different types of aircraft have different wingspans in which a wingspan restriction may apply to some types, but not other types, of aircraft. For example, a Cessna 172 typically will not have wingspan restrictions. An Airbus 380 may have wingspan restrictions on various taxiways.

Aircraft type 326 is the type of aircraft operated by the pilot. In this manner, only restrictions 324 are presented from operational restriction database 306 on navigation chart 318. In these examples, restrictions 324 are presented using graphical indicators 328 in locations 330 for restrictions 324.

Further, electronic map application 302 may present text 332 for restrictions 324 in navigation chart 318. Text 332 may be presented for a particular restriction in response to a user selection of a graphical indicator in graphical indicators 328. In this manner, a pilot or other user may see more detailed information about a restriction within restrictions 324 when needed.

Thus, navigation chart 318 only presents information relevant to the aircraft being operated by a pilot. This type of presentation of restrictions 324 may reduce the workload of a pilot. Further, the time needed to process information may reduce the amount of time needed to take off or taxi towards a gate.

The illustration of data processing system 300 is not meant to imply physical or architectural limitations to the manner in which different advantageous embodiments may be implemented. For example, other components, in addition to, or in place of, the ones illustrated may be employed depending on the particular implementation.

For example, operational restriction database 306 and/or navigation database 304 may be located on a different data processing system or in another location from data processing system 300. Electronic map application 302 also may have an update function to obtain new or current restriction information for operational restriction database 306.

Further, the different advantageous embodiments may present navigation chart 318 in paper format using printer 314. Navigation chart 318 may include information only for a particular type of aircraft or for a limited number of aircraft. In this manner, pilots also may reduce workload and/or time by having a paper chart for the particular type of aircraft being operated by the pilot.

Further, the different advantageous embodiments may be used by users other than pilots. For example, data processing system 300 may be located in a control tower at an airport. A user such as, for example, an air traffic controller, may use electronic map application 302 to identify restrictions for particular aircraft for which the air traffic controller is providing information or controlling.

When used by ground controllers, additional information such as stop bars, taxi routes, and other suitable information also may be presented. Also, in this type of use, restrictions applicable to all aircraft may be shown. If a particular aircraft is selected, then the restrictions applicable to this aircraft may be highlighted or other restrictions may be removed from the presentation. This type of mode may be used by air traffic controllers to plan a taxi route of an aircraft.

Figure 4:
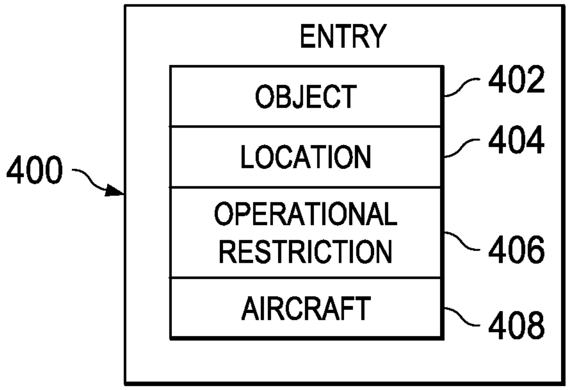
FIG. 4 is a diagram of an entry in an operational restriction database in accordance with an advantageous embodiment.

With reference now to FIG. 4, a diagram of an entry in an operational restriction database is depicted in accordance with an advantageous embodiment. In this example, entry 400 is an example of an entry that may be found in operational restriction database 306 in FIG. 3. Entry 400 includes object 402, location 404, operational restriction 406, and aircraft 408.

Object 402 identifies an object to which a restriction may be applied. For example, object 402 may be a unique identifier, a textual description, or some other identifier. For example, object 402 may be a runway, a building, a taxiway, a barrier, or some other suitable object. Object 402 may be a permanent or a moveable object depending on a particular implementation.

Location 404 identifies the location of object 402. Operational restriction 406 is the restriction on object 402. For example, operational restriction 406 may provide some restriction on movement with respect to object 402. For example, operational restriction 406 may prohibit movement or entry onto object 402, limit speed on object 402, limit turns performed on object 402, or provide some other suitable restriction. Aircraft 408 identifies a number of aircraft to which operational restriction 406 applies.

Entry 400 is an example of only one implementation of how information may be organized in operational restriction database 306. In other advantageous embodiments, other information may be included, in addition to, or in place of, the information illustrated for entry 400 in FIG. 4. For example, entry 400 also may include an identification of times or dates when operational restriction 406 is valid.

Figure 5:
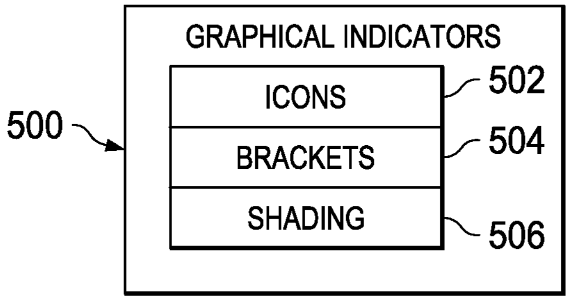
FIG. 5 is a diagram illustrating graphical indicators in accordance with an advantageous embodiment.

With reference now to FIG. 5, a diagram illustrating graphical indicators is depicted in accordance with an advantageous embodiment. Graphical indicators 500 are an example of graphical indicators that may be used to present operational restrictions on a navigation chart. Graphical indicators 500 are an example of one manner in which graphical indicators 328 in FIG. 3 may be implemented.

Graphical indicators 500 include icons 502, brackets 504, and shading 506. Icons 502 may be used to provide visualization of complex conditional restrictions. Icons 502 may be associated with a particular point. For example, icons 502 may be associated with an intersection in which turn information may be presented. Icons 502 may be similar to road signs. For example, icons 502 may include an icon to identify a speed limit, a turn restriction, or some other operational restriction. Icons 502 also may be rotated or oriented for facilitating identification of operational restrictions.

Brackets 504 may provide an intuitive manner to depict short restrictions for objects. For example, brackets 504 may be used to identify restrictions for taxiways. Brackets 504 may indicate that an aircraft may not enter a particular taxiway, runway, or some other suitable area. Brackets 504 also may be used to identify objects causing the restriction such as, for example, a blast fence, a building, or some other suitable object near the prohibited area. Brackets 504 may be scaled such that the distance between the brackets and a centerline provides a visualization of a restriction. For example, in a moving map application, brackets 504 may be used to indicate a value of a wingspan restriction.

Brackets 504 may be used to visualize a narrow segment of an area directly as a bottleneck. The intuitiveness of using brackets 504 may be increased by displaying a shape of the aircraft that also may be to scale with respect to the location and position of brackets 504. For example, if the aircraft icon is larger than the width of the bottleneck generated by brackets 504, the pilot will not enter that particular area.

Shading 506 may be used to indicate status information. Shading 506 may be used to identify elements, such as taxiways or runways. For example, shading may be used to indicate whether a particular area is open or closed. Shading 506 may take various forms. For example, shading 506 may use colors, cross hatching, and/or other suitable indicators in the area in which the operational restriction is present.

Different combinations of icons 502, brackets 504, and/or shading 506 may be used to present operational restrictions on a navigation chart. Further, other types of graphical indicators may be used that provide a capability to convey information in a graphical manner.

The illustration of icons 502, brackets 504, and shading 506 for graphical indicators 500 in FIG. 5 are not meant to imply limitations to the manner in which graphical indicators 500 may be implemented. Graphical indicators 500 also may include, for example, without limitation, bolding, animation, highlighting, and/or other suitable types of graphical indicators.

Figure 6:
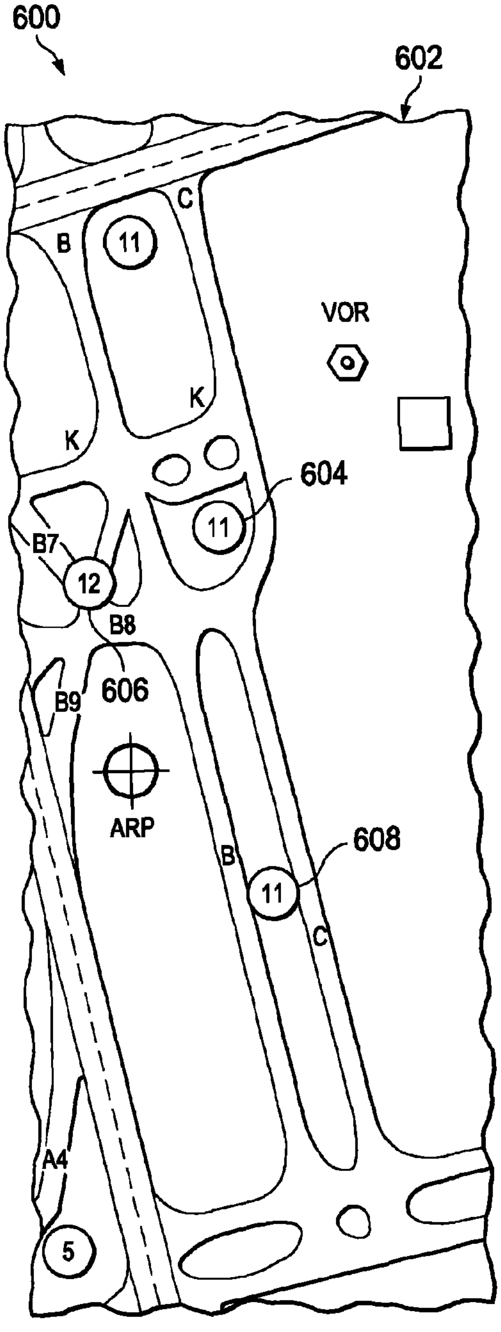
FIG. 6 is a diagram of a currently used paper chart.

With reference now to FIG. 6, a diagram of a currently used paper chart is depicted. In this example, paper chart 600 is an example of the manner in which operational restrictions may be presented for airport area 602.

In this example, restrictions may be identified through indicators such as ball notes 604, 606, and 608. Ball notes 604, 606, and 608 indicate that a restriction may be present. Ball notes 604, 606, and 608, however, do not indicate whether the restriction applies to the particular aircraft being operated by the pilot or what restriction is present.

The pilot must still refer to the text to identify the restriction and to determine whether the restriction applies to the aircraft operated by the pilot. In this example, ball notes 604, 606, and 608 may be “taxiway B and taxiway C between runway 07/25 and taxiway B10 not available to A380 aircraft due to weight limitations”. If the pilot is operating a small aircraft, ball notes 604, 606, and 608 do not apply.

Figure 7:
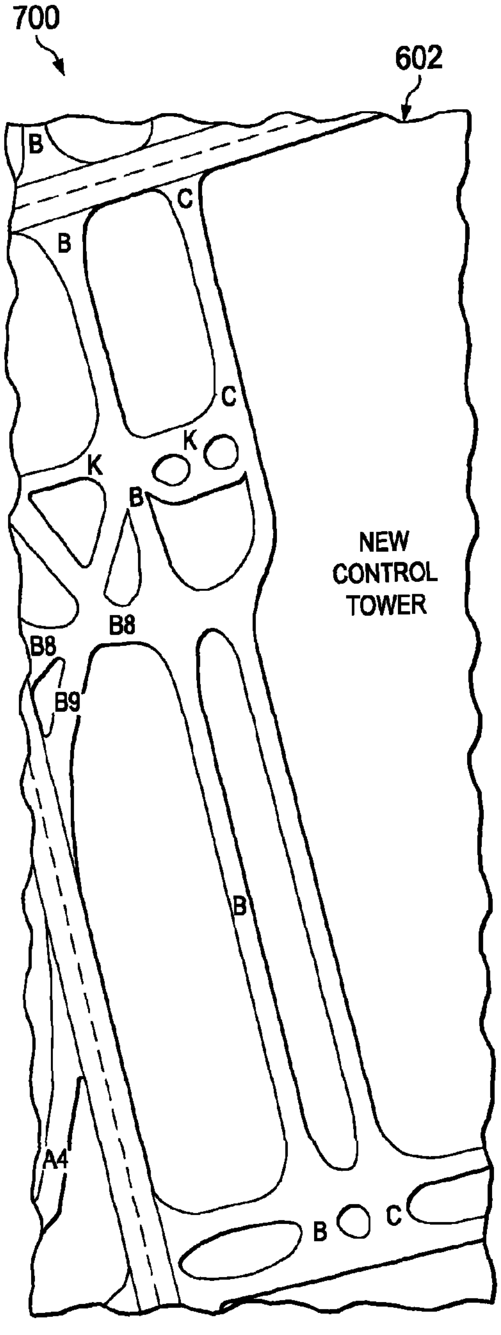
FIG. 7 is a diagram of an aircraft moving map chart.

Turning to FIG. 7, a diagram of an aircraft moving map chart is depicted. In this example, aircraft moving map chart 700 depicts airport area 602. No operational restrictions are illustrated in aircraft moving map chart 700.

As a result, a pilot refers to both aircraft moving map chart 700 and paper chart 600 to perform maneuvers and operations in airport area 602. Further, the pilot also refers to text identified by ball notes 604, 606, and 608 to identify restrictions. The pilot also is required to determine whether those restrictions apply to the aircraft being operated by the pilot. This type of process using currently available charts increases the complexity and/or time needed to perform various maneuvers and operations at an airport.

Figure 8:
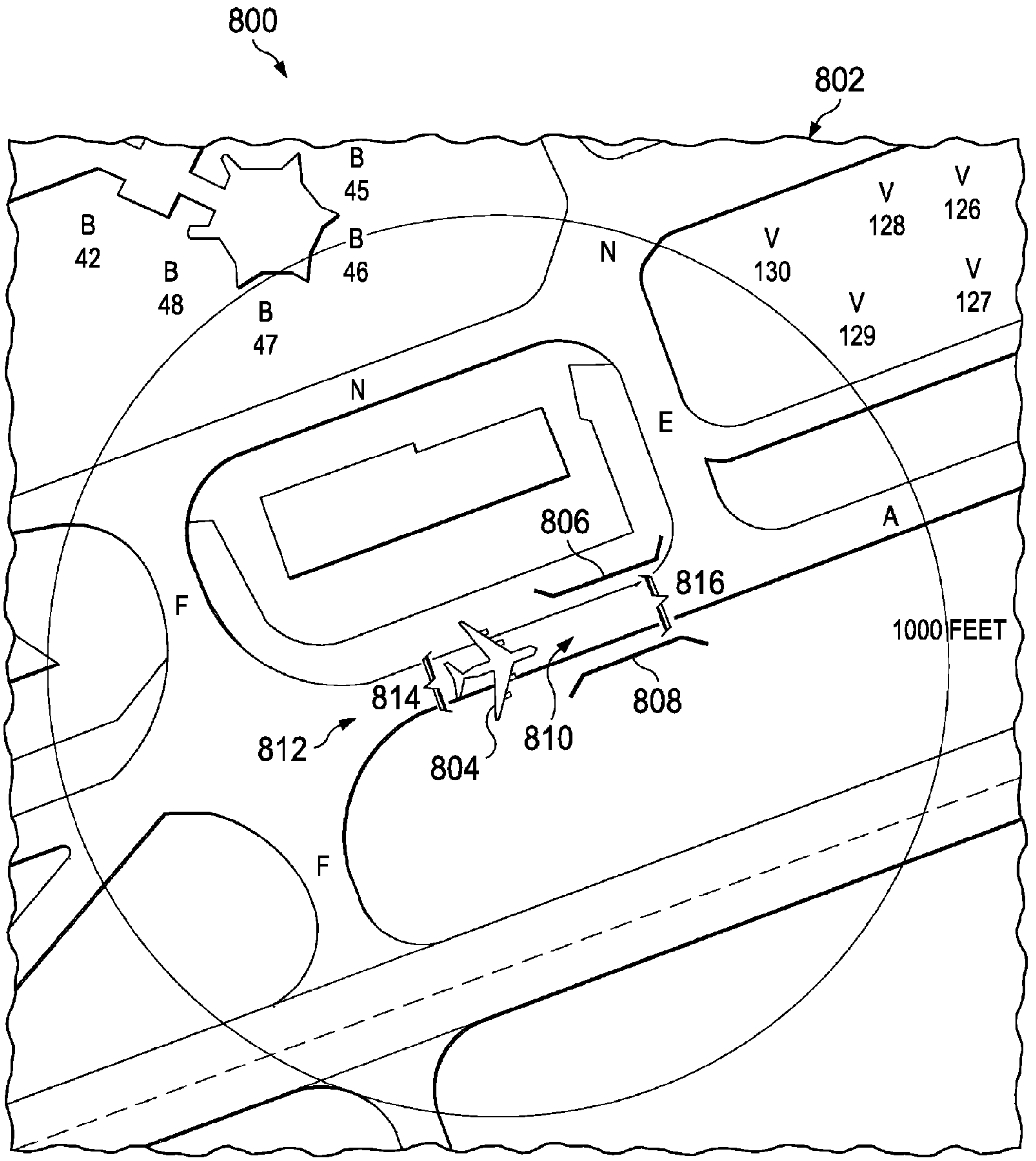
FIG. 8 is a diagram of a navigation chart in accordance with an advantageous embodiment.

With reference now to FIG. 8, a diagram of a navigation chart is depicted in accordance with an advantageous embodiment. In this illustrative example, navigation chart 800 is an example of one implementation for navigation chart 318 in FIG. 3. Navigation chart 800 depicts airport area 802.

Aircraft icon 804 is displayed in airport area 802. The location and position of aircraft icon 804 may correspond to the actual position of the aircraft in the airport area. In this example, bracket 806 and bracket 808 are used to create bottleneck 810 around taxiway 812. Bracket 806 and bracket 808 may be sized and spaced to scale in airport area 802.

Further, aircraft icon 804 also may be to scale in this example. As a result, the pilot can see that wingspan 814 is greater than width 816 of bottleneck 810. As a result, the pilot will stop and not enter bottleneck 810 for taxiway 812.

Although the scale of aircraft icon 804 and brackets 806 and 808 for bottleneck area 810 may aid the pilot, other advantageous embodiments may not use the scale of the features. Instead, the presence of brackets 806 and 808 in navigation chart 800 may indicate that the aircraft cannot enter those areas because bracket 806 and bracket 808 are selected for the particular type of aircraft being operated.

Figure 9:
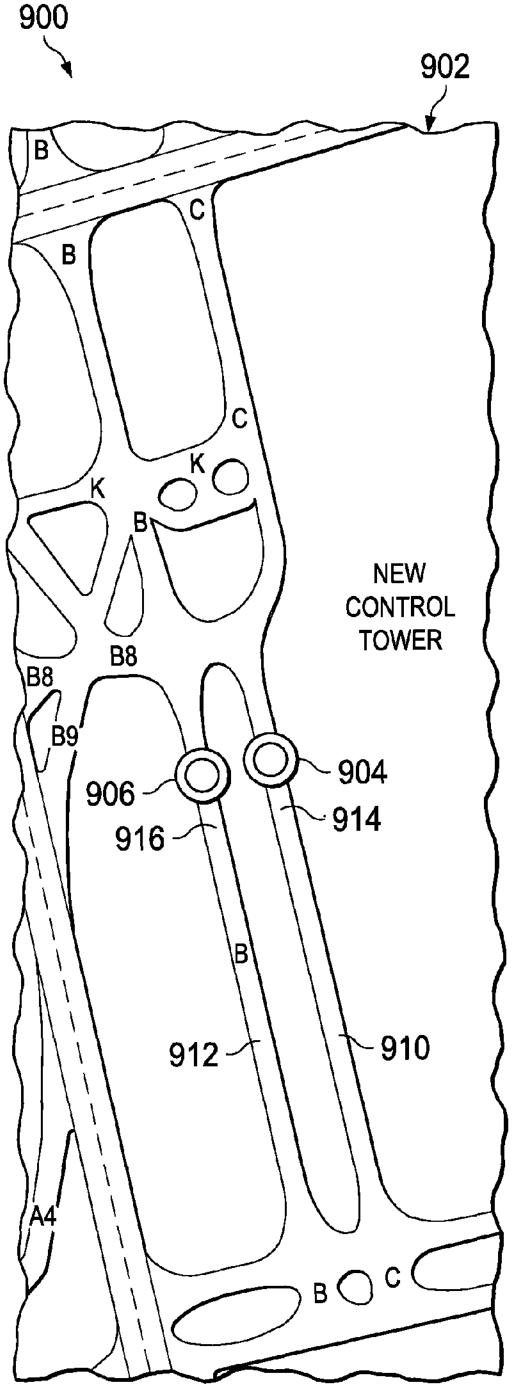
FIG. 9 is a diagram of a navigation chart in accordance with an advantageous embodiment.

Next, FIG. 9 is a diagram of a navigation chart in accordance with an advantageous embodiment. In this example, navigation chart 900 is an example of one implementation of navigation chart 318 in FIG. 3. Navigation chart 900 illustrates airport area 902. In this advantageous embodiment, icons 904 and 906 illustrate a bridge restriction for airport area 902. In this view, taxiway 910 and taxiway 912 are identified as being closed through icons 904 and 906 being displayed on bridges 914 and 916 in taxiways 910 and 912. Icons 904 and 906 indicate that an aircraft may not enter or move onto the area on taxiways 910 and 912 covered by icons 904 and 906.

Figure 10:
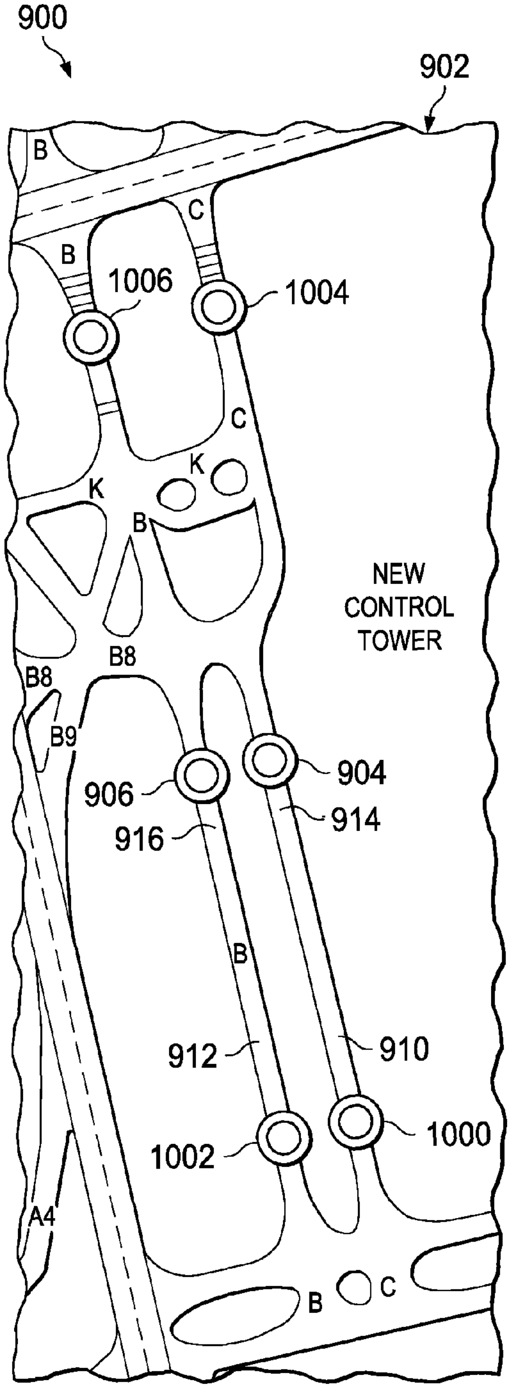
FIG. 10 is a diagram of a navigation chart in accordance with an advantageous embodiment.

With reference now to FIG. 10, a diagram of a navigation chart is depicted in accordance with an advantageous embodiment. In this example, navigation chart 900 also includes icons 1000, 1002, 1004, and 1006. These icons mark all of taxiways 910 and 912 as being closed.

Figure 11:
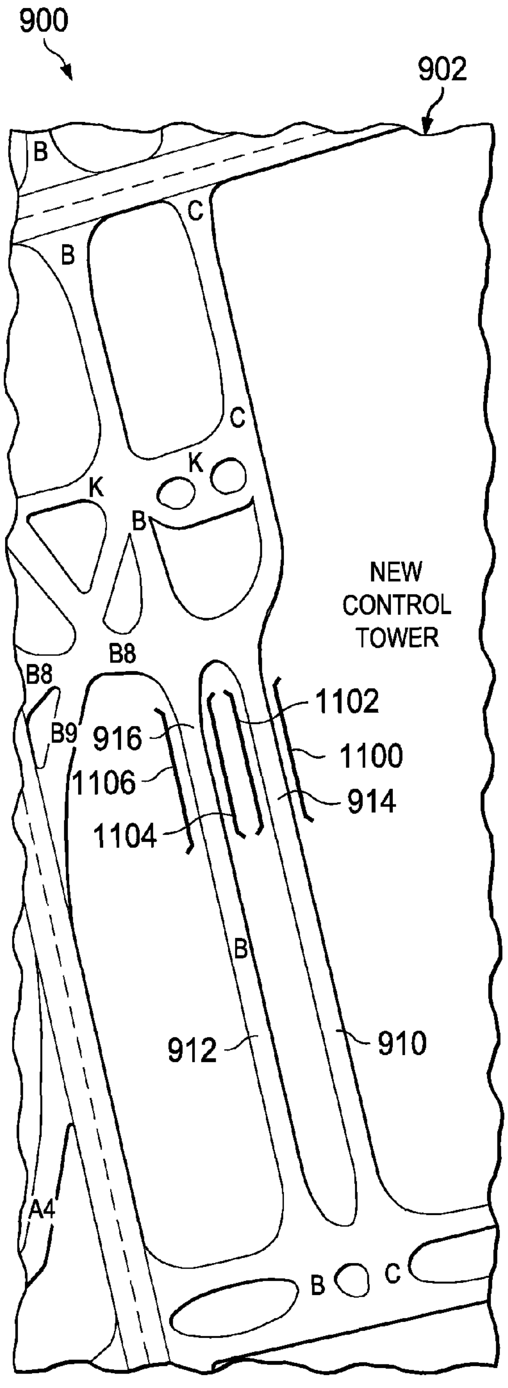
FIG. 11 is a diagram of a navigation chart in accordance with an advantageous embodiment.

With reference now to FIG. 11, a diagram of a navigation chart is depicted in accordance with an advantageous embodiment. Navigation chart 900, in this example, presents brackets 1100, 1102, 1104, and 1106 to indicate a restriction for bridges 914 and 916.

Figure 12:
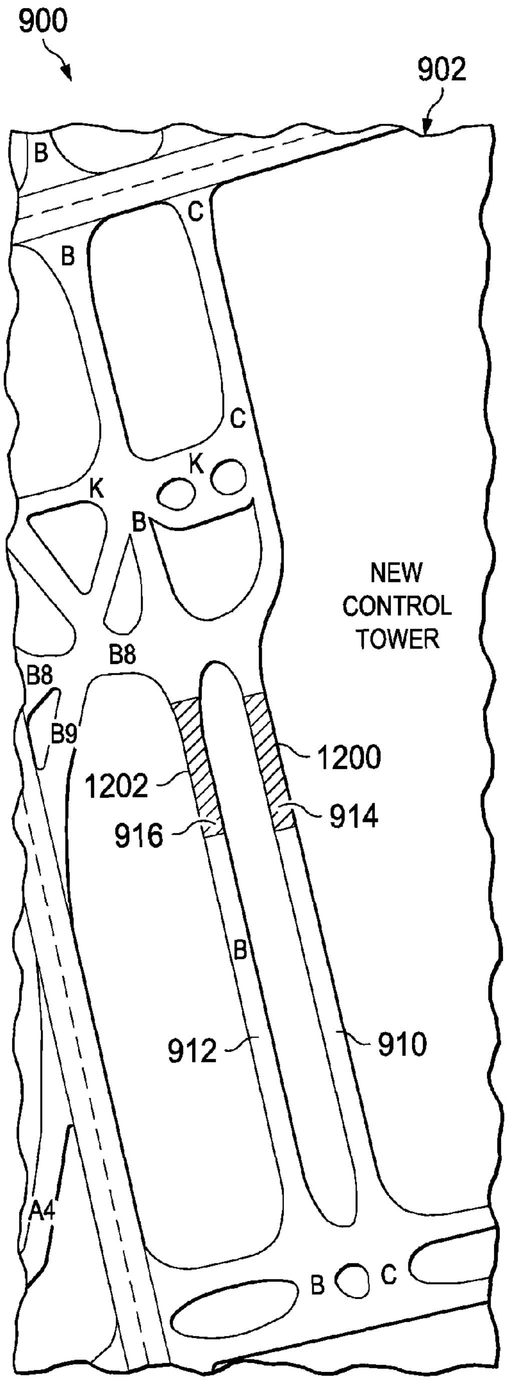
FIG. 12 is a diagram illustrating a navigation chart in accordance with an advantageous embodiment.

With reference now to FIG. 12, a diagram illustrating a navigation chart is depicted in accordance with an advantageous embodiment. Navigation chart 900, in this example, presents shading 1200 and shading 1202 on bridges 914 and 916 to indicate that these bridges are closed.

Figure 13:
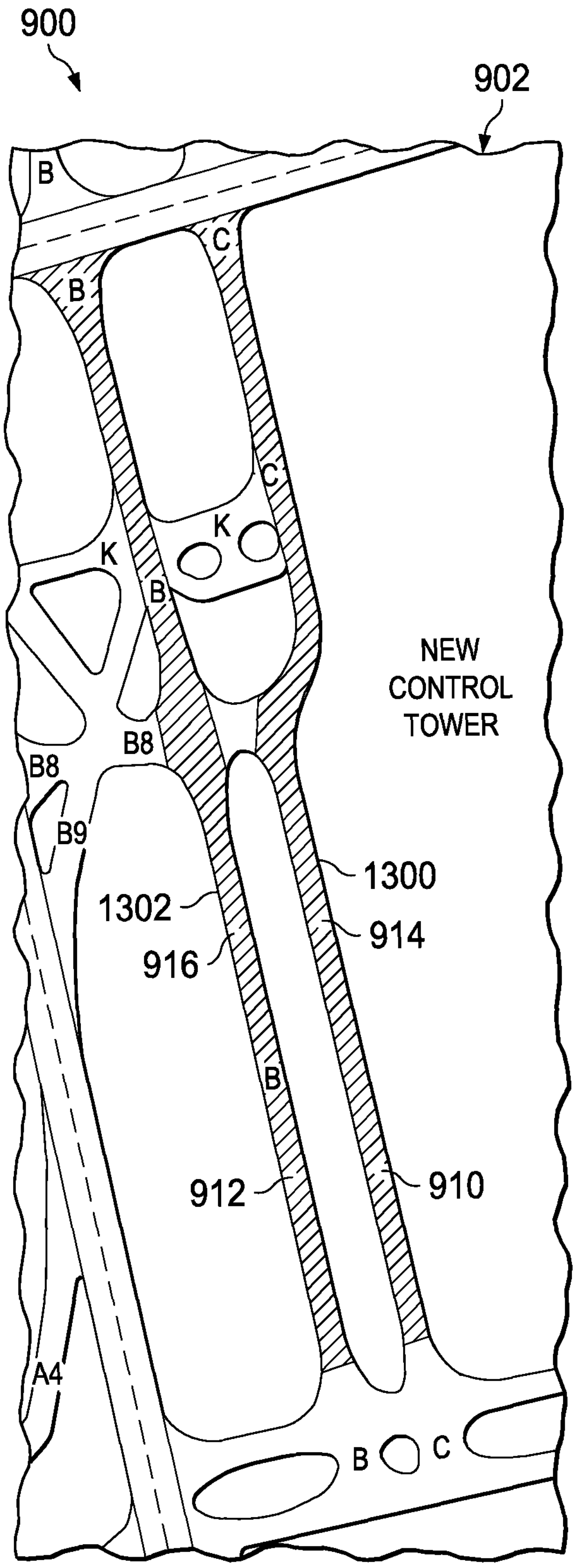
FIG. 13 is a diagram of a navigation chart in accordance with an advantageous embodiment.

In FIG. 13, a diagram of a navigation chart is depicted in accordance with an advantageous embodiment. In this example, shading 1300 and shading 1302 indicate that all of taxiways 910 and 912 are closed in addition to bridges 914 and 916 in airport area 902.

Figure 14:
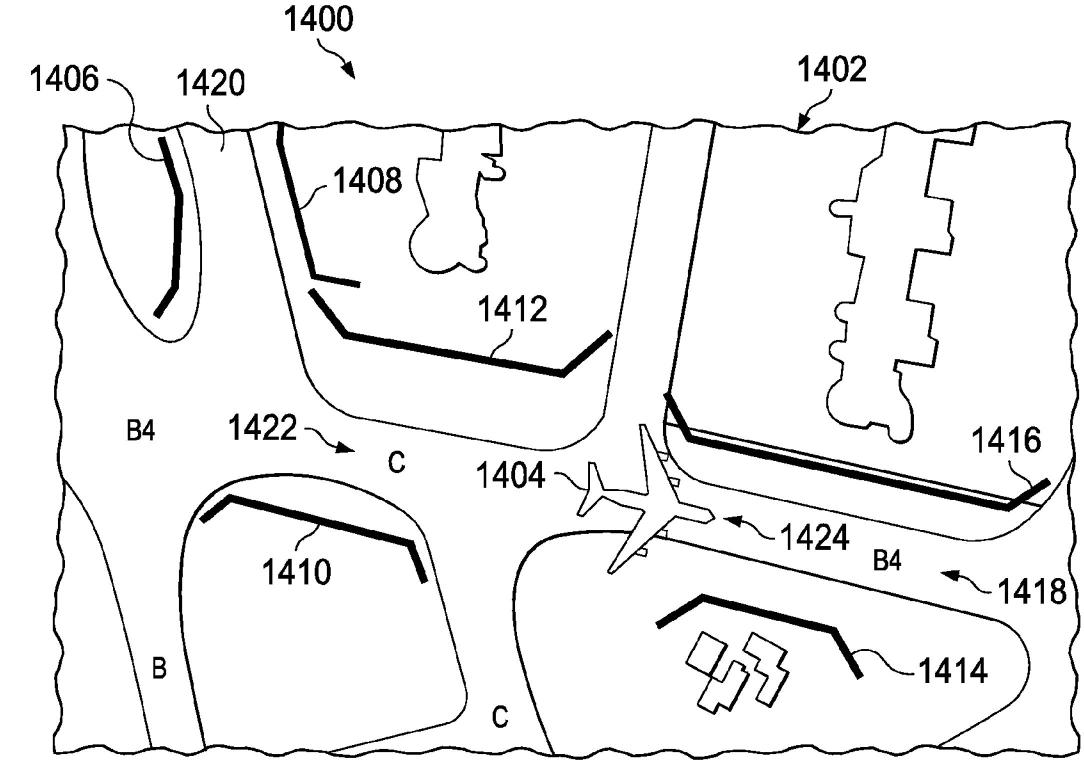
FIG. 14 is a diagram of a navigation chart in accordance with an advantageous embodiment.

In FIG. 14, a diagram of a navigation chart is depicted in accordance with an advantageous embodiment. Navigation chart 1400 is an example of one implementation of navigation chart 318 in FIG. 3. Navigation chart 1400 presents airport area 1402. In this illustrative example, aircraft icon 1404 is depicted in airport area 1402.

Aircraft icon 1404 may be oriented and scaled to indicate the position and size of the aircraft relative to objects depicted for airport area 1402. In addition, brackets 1406, 1408, 1410, 1412, 1414, and 1416 are present to identify restrictions for various segments of taxiway 1418 in these examples. Brackets 1406 and 1408 identify restrictions for segment 1420; brackets 1410 and 1412 identify restrictions for segment 1422; and brackets 1414 and 1416 identify restrictions for segment 1424 of taxiway 1418.

In this example, brackets 1406, 1408, 1410, 1412, 1414, and 1416 also may be color coded. For example, the color red may be used to indicate that movement into these areas defined by the brackets is prohibited.

Figure 15:
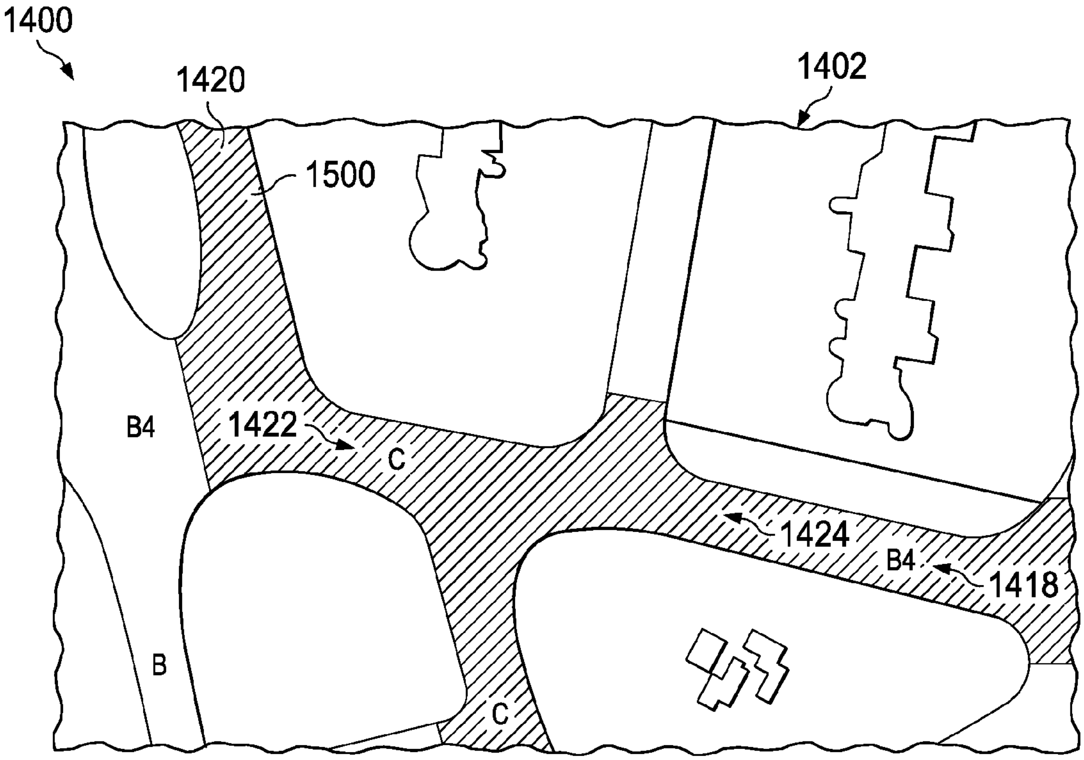
FIG. 15 is a diagram of a navigation chart with shading in accordance with an advantageous embodiment.

With reference now to FIG. 15, a diagram of a navigation chart with shading is depicted in accordance with an advantageous embodiment. In this illustrative example, shading 1500 indicates areas prohibited for an aircraft in a fashion similar to those identified by brackets 1406, 1408, 1410, 1412, 1414, and 1416 in FIG. 14. In this example, the restrictions may be for aircraft having a wingspan greater than 60.4 meters.

Figure 16:
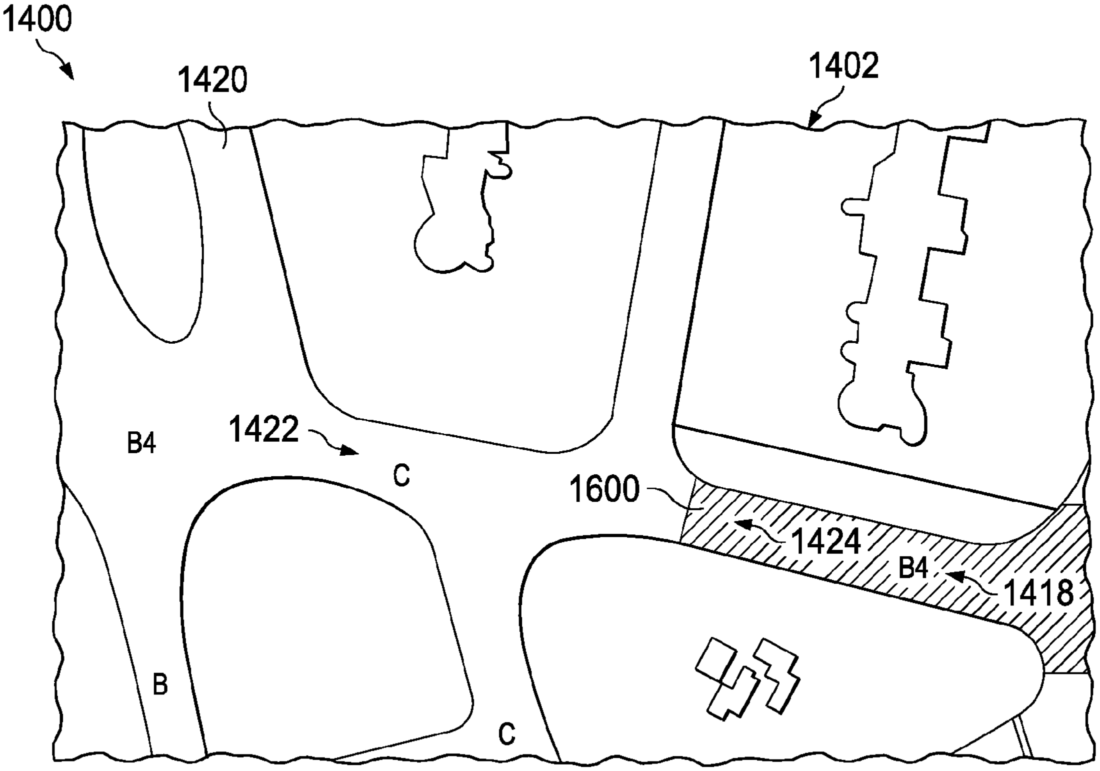
FIG. 16 is a diagram of a navigation chart with shading in accordance with an advantageous embodiment.

With reference to FIG. 16, a diagram of a navigation chart with shading is depicted in accordance with an advantageous embodiment. As depicted, shading 1600 only covers segment 1424 in taxiway 1418. Shading is only present in this area because the type of aircraft selected has a wingspan between 52 meters and 60.4 meters.

As a result, the aircraft may enter segments 1420 and 1422 but not segment 1424 as compared to the restrictions illustrated in FIG. 15. As a result, different restrictions may be presented for a particular type of aircraft providing a pilot a faster and more intuitive way to identify operational restrictions in an airport area as compared to currently available charts and systems.

Figure 17:
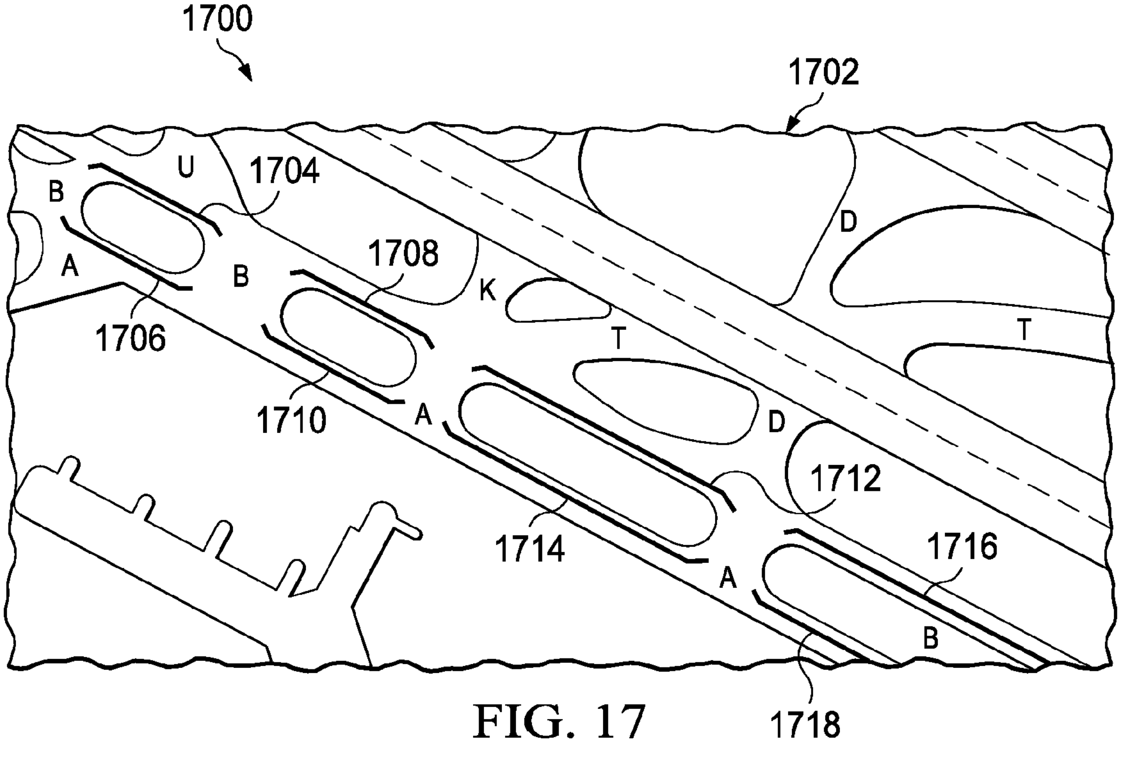
FIG. 17 is a diagram of a navigation chart in accordance with an advantageous embodiment.

In FIG. 17, a navigation chart is depicted in accordance with an advantageous embodiment. Navigation chart 1700 is an example of an implementation for navigation chart 318 in FIG. 3. In this example, navigation chart 1700 depicts airport area 1702. In this example, brackets 1704, 1706, 1708, 1710, 1712, 1714, 1716, and 1718 indicate a warning rather than a prohibition. In this example, colors for brackets 1704, 1706, 1708, 1710, 1712, 1714, 1716, and 1718 may be, for example, yellow, to indicate a warning rather than a prohibition.

Again, a user may identify more information about the operational restrictions indicated by these brackets by selecting a bracket to obtain textual or other information.

Figure 18:
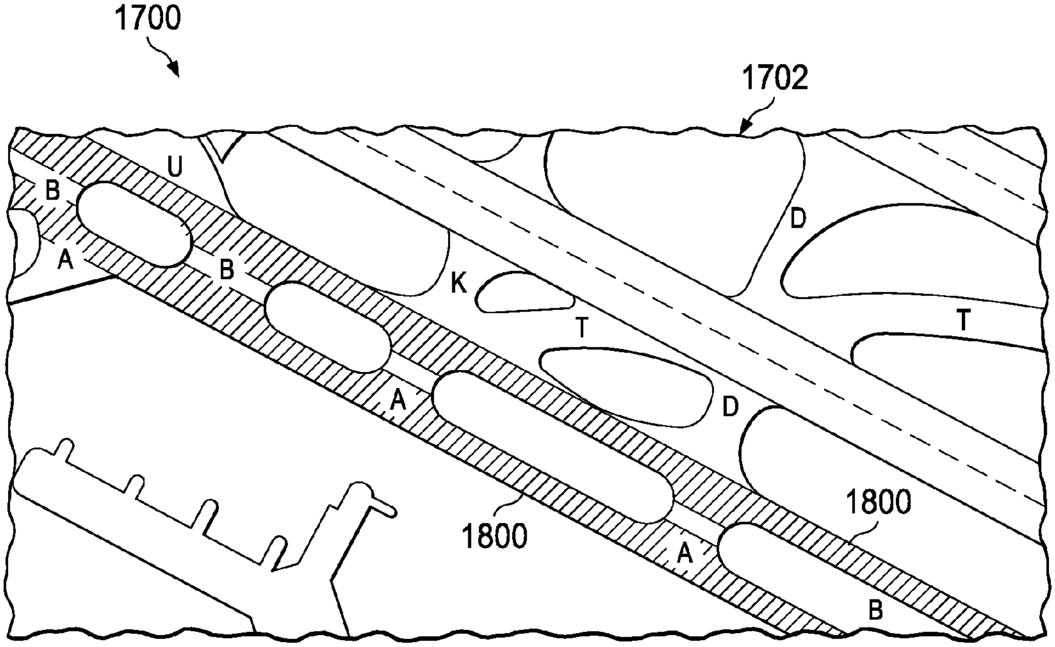
FIG. 18 is a diagram of a navigation chart using shading in accordance with an advantageous embodiment.

With reference now to FIG. 18, a diagram of a navigation chart using shading is depicted in accordance with an advantageous embodiment. In this example, shading 1800 may be used to identify the restrictions in airport area 1702. Although the different graphical indicators do not provide detailed information about the restrictions, additional information may be identified by selecting a graphical indicator.

Figure 19:
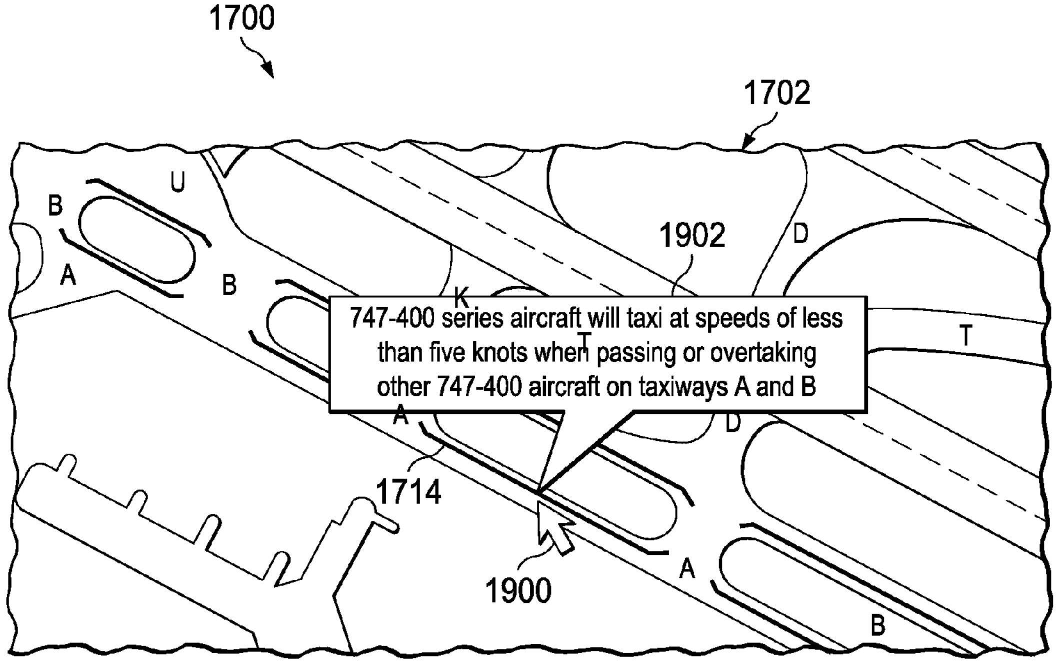
FIG. 19 is a diagram of a navigation chart with text in accordance with an advantageous embodiment.

With reference next to FIG. 19, a diagram of a navigation chart with text is depicted in accordance with an advantageous embodiment. In this example, a user has selected bracket 1714 using pointer 1900. In response to this selection, popup display 1902 is presented in navigation chart 1700. Popup display 1902 includes additional information about the operational restriction.

For example, popup display 1902 may indicate that for a 747-400 series aircraft, taxiing should be performed at speeds of less than five knots when passing or overtaking other 747-400 aircraft on taxiways A and B. The selection using pointer 1900 may be made by moving pointer 1900 over bracket 1714 or moving pointer 1900 over bracket 1714 and selecting bracket 1714 with a command.

Figure 20:
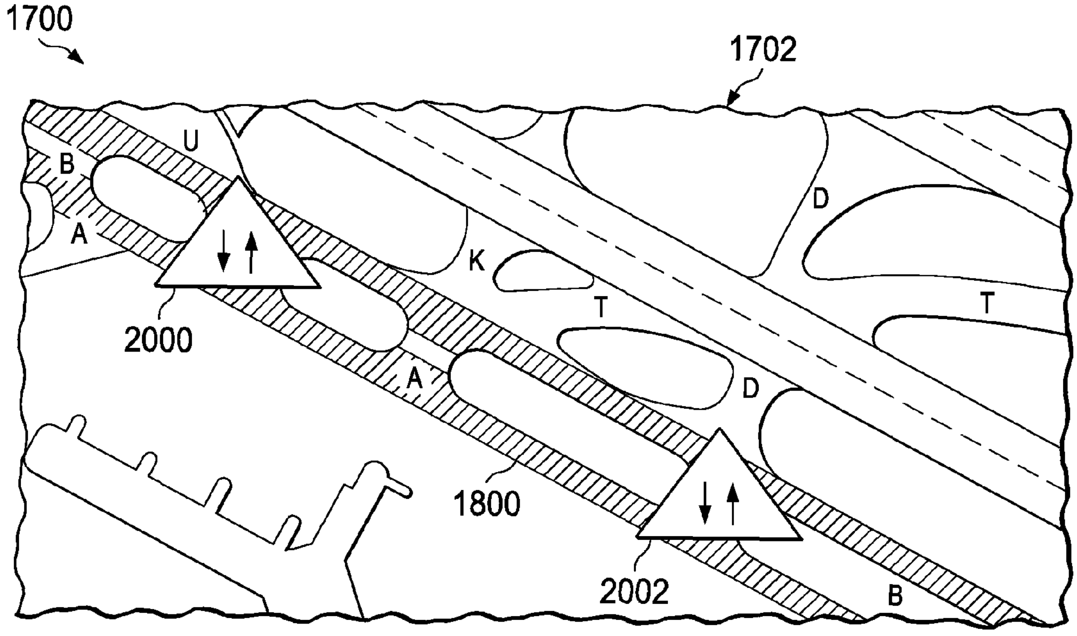
FIG. 20 is a diagram of a navigation chart with icons in accordance with an advantageous embodiment.

In FIG. 20, a diagram of a navigation chart with icons is depicted in accordance with an advantageous embodiment. In this illustrative example, icons 2000 and 2002 are displayed in conjunction with shading 1800 in airport area 1702 for navigation chart 1700. This combination of shading and icons may be used to present more information to allow a pilot to visualize complex conditions. Symbols 2000 and 2002 indicate that oncoming traffic is present. Of course, the orientations of these symbols may be changed for different orientations of navigation chart 1700.

Figure 21:
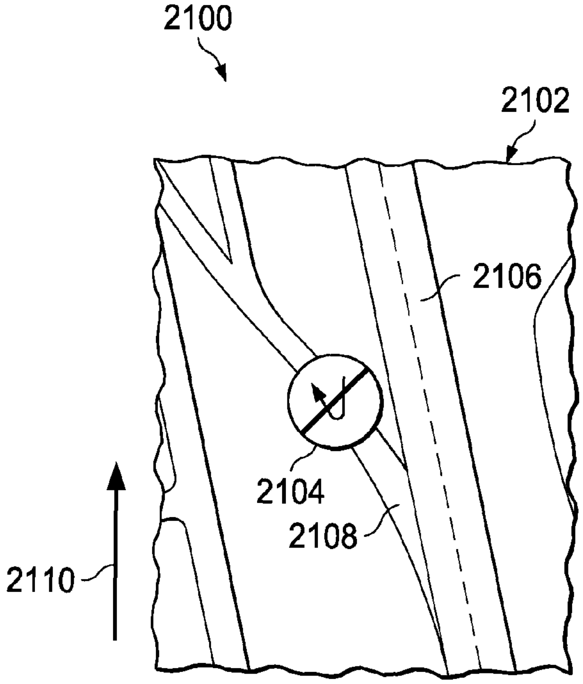
FIG. 21 is a diagram of a navigation chart in accordance with an advantageous embodiment.

With reference now to FIG. 21, a diagram of a navigation chart is depicted in accordance with an advantageous embodiment. Navigation chart 2100 is an example of an implementation of navigation chart 318 in FIG. 3. Navigation chart 2100 depicts airport area 2102. In this illustrative example, icon 2104 indicates that no right turn may be made from runway 2106. In other words, an aircraft may not turn right at exit 2108. In this example, navigation chart 2100 is shown in a briefing mode or north up orientation as indicated by arrow 2110.

Figure 22:
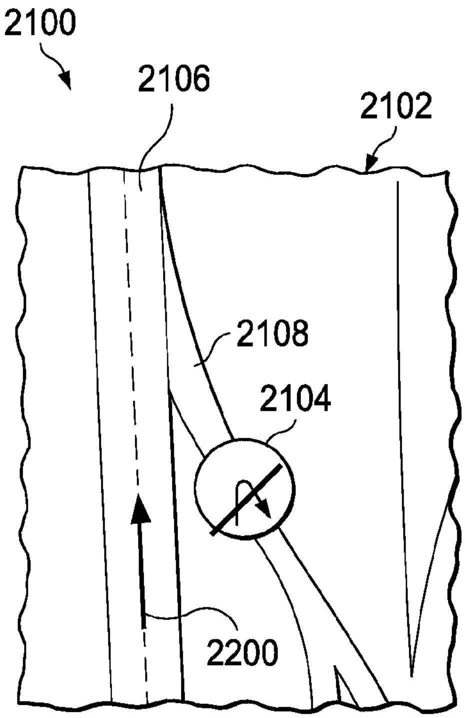
FIG. 22 is a diagram of a navigation chart in accordance with an advantageous embodiment.

In FIG. 22, a diagram of a navigation chart is depicted in accordance with an advantageous embodiment. As illustrated, navigation chart 2100 is shown in a head up orientation with the aircraft moving in the direction of arrow 2200. As can be seen, icon 2104 also may be rotated or positioned to identify the prohibition of a right turn at exit 2108.

Figure 23:
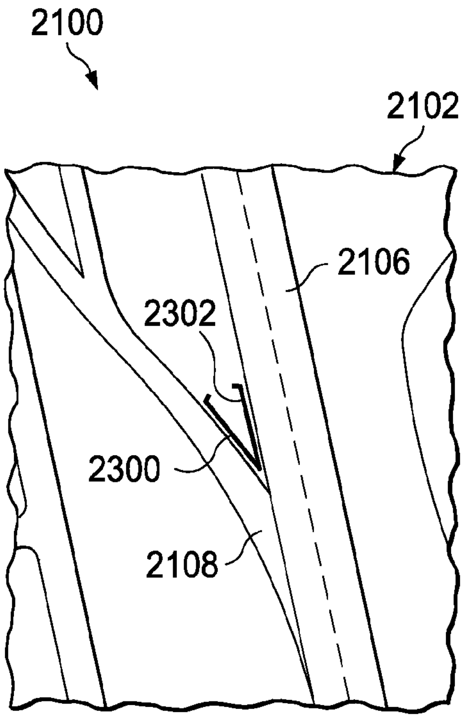
FIG. 23 is a diagram of a navigation chart in accordance with an advantageous embodiment.

With reference now to FIG. 23, a diagram of a navigation chart is depicted in accordance with an advantageous embodiment. In this example, brackets 2300 and 2302 are positioned around exit 2108 to indicate that a prohibition is present. Further, these brackets may be color coded to indicate that the operational restriction is a prohibition of a particular maneuver rather than a caution.

Figure 24:
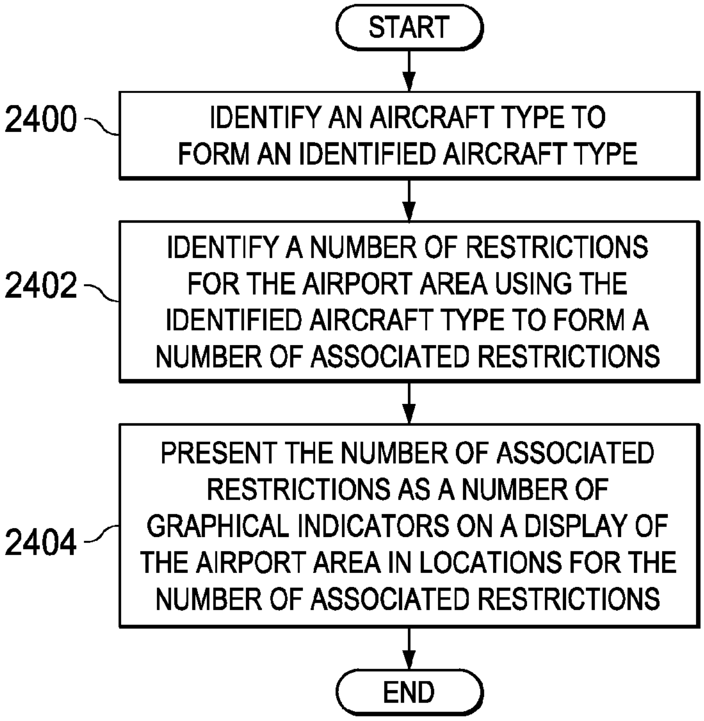
FIG. 24 is a flowchart of a process for identifying operational restrictions for an airport area in accordance with an advantageous embodiment.

With reference now to FIG. 24, a flowchart of a process for identifying operational restrictions for an airport area is depicted in accordance with an advantageous embodiment. The process illustrated in FIG. 24 may be implemented in a software component such as, for example, electronic map application 302. In this example, the process may be implemented in restriction process 322 for electronic map application 302 in FIG. 3.

The process begins by identifying an aircraft type to form an identified aircraft type (operation 2400). The process then identifies a number of restrictions for the airport area using the identified aircraft type to form a number of associated restrictions (operation 2402). The process then presents the number of associated restrictions as a number of graphical indicators on a display of the airport area in locations for the number of associated restrictions (operation 2404), with the process terminating thereafter. The presenting step may be performed using a display device in which a moving map or other electronic chart is presented on the display device.

In other advantageous embodiments, the presenting step may be formed by sending the information to an output device, such as a printer, to generate a paper chart. Although paper charts may be static, a tailored paper chart for a particular type of aircraft may be generated. A chart for each aircraft type and other factors influencing restrictions may reduce the complexity of charts when used by an operator of a particular type of aircraft.

For example, different types of aircraft, which may have the same restrictions, may be grouped together. As a result, the paper charts may include a presentation for a number of different types of aircraft that have the same restrictions. For example, if a chart is for wingspan restrictions, then the paper chart may show all of the aircraft that fall within a particular wingspan restriction that may be used by a particular airline.

Figure 25:
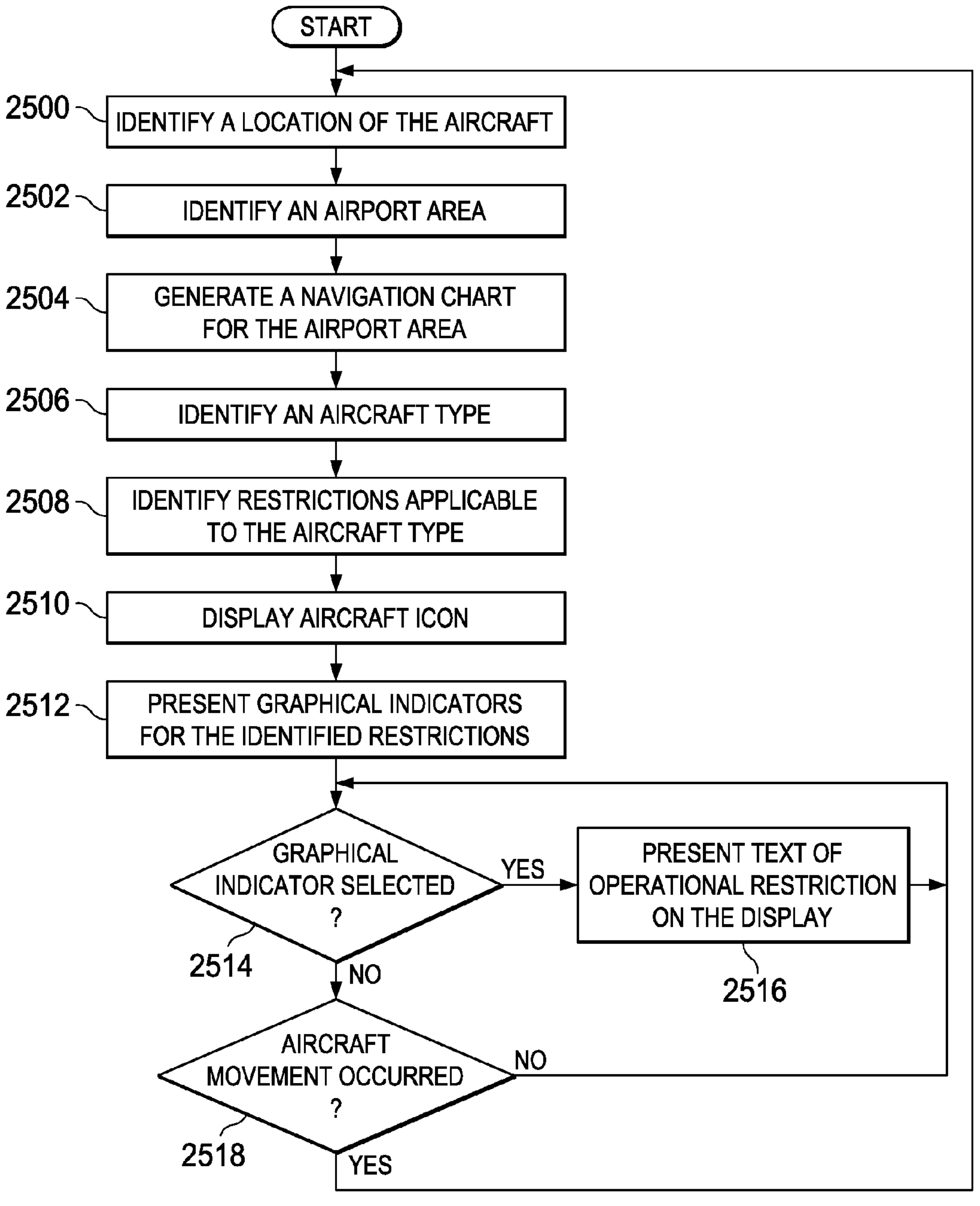
FIG. 25 is a flowchart of a process for identifying operational restrictions for an airport area using a moving map in accordance with an advantageous embodiment.

With reference now to FIG. 25, a flowchart of a process for identifying operational restrictions for an airport area using a moving map is depicted in accordance with an advantageous embodiment. The process illustrated in FIG. 25 may be implemented in a software component such as, for example, electronic map application 302. In particular, some operations may be implemented using restriction process 322 in FIG. 3.

The process begins by identifying a location of the aircraft (operation 2500). The process then identifies an airport area (operation 2502). The airport area may be identified based on the location of the aircraft. The airport area may be, for example, a portion of the airport or the entire airport. When the airport area is a portion of the airport, the airport area may be an area based on a distance around the aircraft.

The process generates a navigation chart for the airport area (operation 2504). This chart may be generated using navigation data such as, for example, navigation data 316 in FIG. 3. The process identifies an aircraft type (operation 2506).

The process identifies restrictions applicable to the aircraft type (operation 2508). These restrictions may be identified using a database or other data structure such as, for example, operational restriction database 306 in FIG. 3. The process then displays the aircraft icon on the navigation chart (operation 2510). The aircraft icon is displayed in a location and orientation relative to the actual position of the aircraft in the airport area. Further, the aircraft icon may also be scaled relative to other elements being presented in the navigation chart.

The process then presents graphical indicators for the identified restrictions (operation 2512). A determination may then be made as to whether a graphical indicator has been selected from the graphical indicators (operation 2514). If a graphical indicator has been selected, text of the operational restriction is presented on the display (operation 2516).

The process then returns to operation 2514. In operation 2516, the text remains until the user moves the pointer off of the indicator or deflects it. In some advantageous embodiments, operation 2516 may present the text only for a limited period of time. With reference again to operation 2514, if a graphical indicator has not been selected, a determination is made as to whether aircraft movement has occurred (operation 2518). If the aircraft has moved, the process returns to operation 2500. Otherwise, the process returns to operation 2514.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for graphically identifying operational restrictions for an airport area. In the different advantageous embodiments, an aircraft type is identified. A number of restrictions for the airport area is identified using the identified aircraft type. The number of restrictions is presented on a display of the airport area in locations for the number of associated restrictions.

In this manner, the different advantageous embodiments provide a capability to more intuitively present operational restriction information to users as compared to currently available charts and systems. Further, the different advantageous embodiments may reduce the amount of time and/or workload of various users. These users include pilots, air traffic controllers, and other suitable users.

The different advantageous embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by, or in connection with, the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for graphically identifying operational restrictions for an airport area, the method comprising, sequentially:

designating, in a processor comprising hardware and software, a display control aircraft from among all aircraft on the airport area, wherein designating comprises: the processor designating an aircraft, the aircraft containing a display associated with the processor, as the display control aircraft, and receiving inputs that designate the display control aircraft from among all aircraft on the airport area, and further wherein the airport area comprises all ground surfaces within an airport's geographic boundary that the display control aircraft can occupy or move over;

identifying, using the processor, an aircraft type of the display control aircraft;

forming, using the processor, an identified aircraft type, wherein the identified aircraft type is the display control aircraft identified by its aircraft type;

identifying, using the processor, a restriction for the airport area affecting the identified aircraft type, wherein the restriction comprises: a Notice to Airmen, a restriction to aircraft movement on the airport area, a restriction to aircraft operations on the airport area; a preferential taxi route on the airport area; and a preferential operating procedure on the airport area;

forming, using the processor, an associated restriction, wherein the associated restriction comprises any restriction that affects the identified aircraft type, and excludes any restriction that cannot affect the identified aircraft type;

transforming, using the processor, the associated restriction into a graphical indicator, wherein the graphical indicator comprises the associated restriction and a location on the airport area that the associated restriction affects;

communicating the graphical indicator to the display; and presenting, on the display, the graphical indicator on a graphical representation of the airport area in locations on the graphical representation of the airport area where the associated restriction applies.

2. The method of claim 1 further comprising:

identifying a location of the display control aircraft in the airport area; and displaying an aircraft icon on the graphical representation of the airport area in the location of the display control aircraft in the airport area.

3. The method of claim 1, wherein the step of identifying the restriction for the airport area using the identified aircraft type to form the associated restriction comprises:

comparing a characteristic of the identified aircraft type to the restriction for the airport area; and identifying if the restriction applies to the characteristic of the identified aircraft type to form the associated restriction.

4. The method of claim 1 further comprising:

responding to a selection of the graphical indicator on the display, presenting additional information about a restriction associated with the graphical indicator.

5. The method of claim 3, wherein the restriction identifies a location for the restriction and the characteristic that is restricted.

6. The method of claim 3, wherein the characteristic is selected from at least one-of a wing span, an aircraft weight, a speed, a turn radius, an aircraft type, an aircraft length, a tire pressure, a time, an engine thrust, performance data, a compatible parking gate, a time, and a date.

7. The method of claim 1, wherein the graphic representation of the airport area is a moving map display of the airport area.

8. The method of claim 1, wherein the graphic representation of the airport area is a map of the airport area and wherein the step of presenting the associated restriction as the graphical indicator on the graphic representation of the airport area in locations for the associated restriction comprises:

printing the map of the airport area with the associated restriction presented on the map as the graphical indicator on the map of the airport area in locations for the associated restriction.

9. The method of claim 1, wherein the graphical indicator is selected from at least one of a bracket, an icon, shading, highlighting, animation, and color.

10. The method of claim 1, wherein the steps of identifying the aircraft type to form the identified aircraft type; identifying the restriction for the airport area using the identified aircraft type to form the associated restriction; and presenting the associated restriction as the graphical indicator on the graphic representation of the airport area in locations for the associated restriction are executed in a data processing system serving one of the aircraft, and an air traffic control facility.

11. An apparatus comprising:

a display; and a processor, wherein the processor comprises: hardware, and software, configured for sequentially:

designating, using the processor, a display control aircraft from among all aircraft on an airport area, wherein designating comprises: the processor automatically designating an aircraft, the aircraft containing a display associated with the processor, as the display control aircraft, and receiving inputs that designate the display control aircraft from among all aircraft on the airport area, and further wherein the airport area comprises all ground surfaces within an airport's geographic boundary that the display control aircraft can occupy or move over;

identifying, using the processor, an aircraft type of the display control aircraft;

forming, using the processor, an identified aircraft type, wherein the identified aircraft type is the display control aircraft identified by its aircraft type;

identifying, using the processor, a restriction for the airport area affecting the identified aircraft type, wherein the restriction comprises: a Notice to Airmen, a restriction to aircraft movement on the airport area, a restriction to aircraft operations on the airport area; a preferential taxi route on the airport area; and a preferential operating procedure on the airport area;

forming, using the processor, an associated restriction, wherein the associated restriction comprises any restriction that affects the identified aircraft type, and excludes any restriction that cannot affect the identified aircraft type; and transforming, using the processor, the associated restriction into a graphical indicator, wherein the graphical indicator comprises the associated restriction and a location on the airport area that the associated restriction affects;

communicating the graphical indicator to the display; and presenting, on the display, the graphical indicator on a graphical representation of the airport area in locations on the graphical representation of the airport area where the associated restriction applies.

12. The apparatus of claim 11, wherein the processor is further capable of identifying a location of the display control aircraft in the airport area; and displaying an aircraft icon on the display of the airport area in the location of the display control aircraft in the airport area.

13. The apparatus of claim 11, wherein in identifying the restriction for the airport area using the identified aircraft type to form the associated restriction, the processor is capable of comparing a characteristic for the identified aircraft type to the restriction for the airport area; and identifying if the restriction applies to the characteristic of the identified aircraft type to form the associated restriction.

14. The apparatus of claim 11, wherein the processor is further capable of presenting additional information about the restriction associated with the graphical indicator in response to a selection of the graphical indicator on the display.

15. The apparatus of claim 11, wherein the display of the airport area is a map of the airport area, and wherein in presenting the associated restriction as the graphical indicator on the display of the airport area in locations for the associated restriction, the processor is capable of printing the map of the airport area with the associated restriction presented on the map as the graphical indicator on the map of the airport area in locations for the associated restriction.

16. A computer program product for graphically identifying operational restrictions for an airport area, the computer program product comprising:

a non-transitory computer recordable storage medium;

program code, stored on the non-transitory computer recordable storage medium, for sequentially designating a display control aircraft from among all aircraft on the airport area, wherein designating comprises: the program code automatically designating an aircraft, the aircraft containing a display associated with the program code, as the display control aircraft, and receiving inputs that designate the display control aircraft from among all aircraft on the airport area, and further wherein the airport area comprises all ground surfaces within an airport's geographic boundary that the display control aircraft can occupy or move over;

program code, stored on the non-transitory computer recordable storage medium, for identifying an aircraft type of the display control aircraft;

program code, stored on the non-transitory computer recordable storage medium, for forming, using the program code, an identified aircraft type, wherein the identified aircraft type is the display control aircraft identified by its aircraft type;

program code, stored on the non-transitory computer recordable storage medium, for identifying a restriction for the airport area affecting the identified aircraft type, wherein the restriction comprises: a Notice to Airmen, a restriction to aircraft movement on the airport area, a restriction to aircraft operations on the airport area; a preferential taxi route on the airport area; and a preferential operating procedure on the airport area;

program code, stored on the non-transitory computer recordable storage medium, for forming an associated restriction, wherein the associated restriction comprises any restriction that affects the identified aircraft type, and excludes any restriction that cannot affect the identified aircraft type;

program code, stored on the non-transitory computer recordable storage medium, for transforming the associated restriction into a graphical indicator, wherein the graphical indicator comprises the associated restriction and a location on the airport area that the associated restriction affects;

program code, stored on the non-transitory computer recordable storage medium, for communicating the graphical indicator to the display; and program code, stored on the non-transitory computer recordable storage medium, for presenting on the display, the graphical indicator on a graphical representation of the airport area in locations on the graphical representation of the airport area where the associated restriction applies.

17. The computer program product of claim 16 further comprising:

program code, stored on the non-transitory computer recordable storage medium, for identifying a location of the display control aircraft in the airport area; and program code, stored on the non-transitory computer recordable storage medium, for displaying an aircraft icon on the graphical representation of the airport area in the location of the display control aircraft in the airport area.

18. The computer program product of claim 16, wherein the program code, stored on the non-transitory computer recordable storage medium, for identifying a number of restrictions on the airport area using the identified aircraft type to form a number of associated restrictions comprises:

program code, stored on the non-transitory computer recordable storage medium, for comparing a characteristic for the identified aircraft type to the restriction for the airport area; and program code, stored on the non-transitory computer recordable storage medium, for identifying if the restriction applies to the characteristic of the identified aircraft type to form the associated restriction.

19. The computer program product of claim 16 further comprising:

program code, stored on the non-transitory computer recordable storage medium, for presenting additional information about a restriction associated with the graphical indicator in response to a selection of the graphical indicator on the display.

20. The computer program product of claim 16, wherein the graphical representation of the airport area is a map of the airport area, and wherein the program code, stored on the non-transitory computer recordable storage medium, for presenting the associated restriction as the graphical indicator on the display of the airport area in locations for the associated restriction comprises:

program code, stored on the non-transitory computer recordable storage medium, for printing the map of the airport area with the associated restriction presented on the map as the graphical indicator on the map of the airport area in locations for the associated restriction.

* * * * *